United States Patent [19]

Brestel et al.

[11] Patent Number: 4,519,579
[45] Date of Patent: May 28, 1985

[54] CAM VALVE SELF-CENTERING SEAT

[75] Inventors: Ronald R. Brestel; Dale L. Meyer, both of Marshalltown, Iowa

[73] Assignee: Fisher Controls, International, Inc., Marshalltown, Iowa

[21] Appl. No.: 466,186

[22] Filed: Feb. 14, 1983

[51] Int. Cl.³ .............................................. F16K 25/00
[52] U.S. Cl. .................................... 251/172; 251/174; 251/177; 251/298
[58] Field of Search ............... 251/314, 315, 306, 307, 251/172, 173, 174, 177, 228, 298, 333; 277/206 R

[56] References Cited

U.S. PATENT DOCUMENTS

| 1,859,039 | 5/1932 | Joyce | 277/206 R |
|---|---|---|---|
| 2,454,160 | 11/1948 | Greene | 251/258 |
| 3,063,467 | 11/1962 | Roberts et al. | 137/516.29 |
| 3,192,690 | 7/1965 | Taylor | 277/236 |
| 3,250,510 | 5/1966 | Williams | 251/306 |
| 3,623,696 | 11/1971 | Baumann | 251/85 |
| 3,870,071 | 3/1975 | Graham et al. | 137/527 |
| 4,114,907 | 9/1978 | Abbes et al. | 277/206 R |
| 4,118,008 | 10/1978 | Myers | 251/298 |
| 4,215,846 | 8/1980 | Ishizuka et al. | 251/298 |
| 4,230,139 | 10/1980 | Scaramucci | 251/173 |
| 4,281,942 | 8/1981 | Gaeckle et al. | 277/206 A |
| 4,290,581 | 9/1981 | Moran et al. | 251/172 |

FOREIGN PATENT DOCUMENTS

| 681649 | 3/1964 | Canada | 251/307 |
|---|---|---|---|
| 1050982 | 12/1966 | United Kingdom | 251/306 |

Primary Examiner—Martin P. Schwadron
Assistant Examiner—James R. Shay
Attorney, Agent, or Firm—Dale A. Kubly; Nicholas A. Camasto

[57] ABSTRACT

A fluid valve capable of operation in high pressure, bidirectional flowpaths includes a chamber having a circular port in which an axially and radially movable seat ring is engaged by an eccentrically movable valve plug having a spherically convex sealing surface. The plug is mounted to a valve shaft supported in the body for rotation about an axis transverse to, but offset from, the centerline of the port. The seat ring, body and a retainer ring include among them a pair of annular channels for retaining a pair of seals adapted for improving their sealing action with pressure.

19 Claims, 13 Drawing Figures

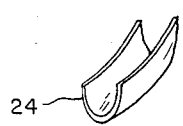
FIGURE 5A
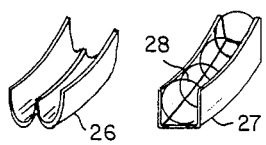
FIGURE 5C
FIGURE 5B    FIGURE 5D
FIGURE 6
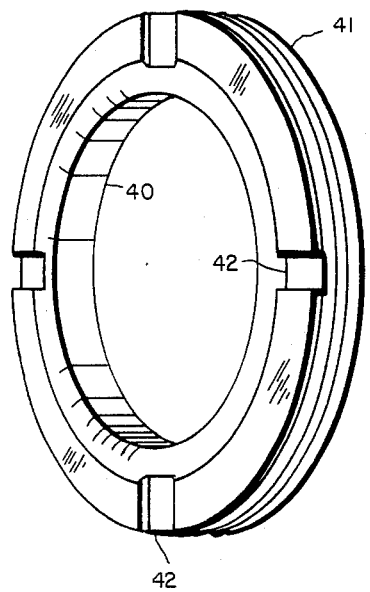
FIGURE 7
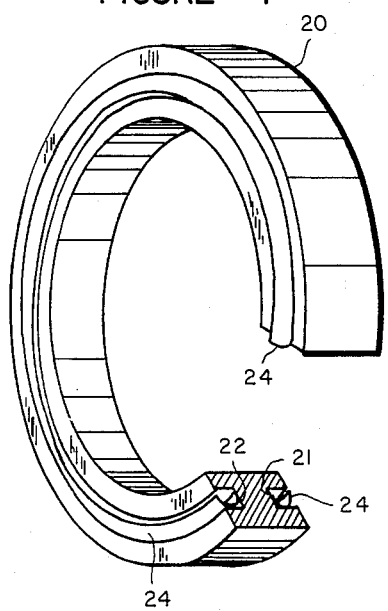
FIGURE 9
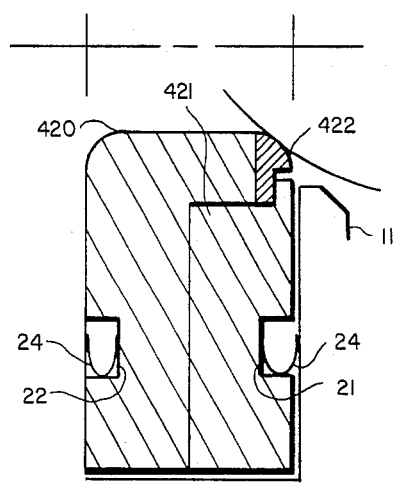
FIGURE 8
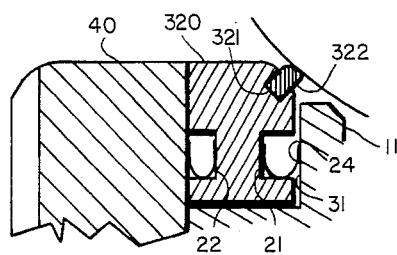
FIGURE 10
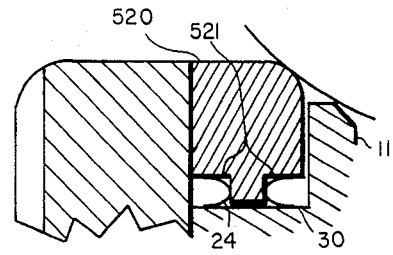

CAM VALVE SELF-CENTERING SEAT

BACKGROUND OF THE INVENTION AND PRIOR ART

The present invention relates generally to fluid flow control valves and specifically to rotary fluid control valves of the type where a valve plug and a valve seat are brought into a fluid tight sealing engagement through an eccentric swinging movement of the valve plug.

Many different forms of rotary valves of the type identified above are known in the art. Such valves are also referred to as cam ball valves and eccentric ball valves and the terms are used interchangeably herein. One very popular valve of this type has a rigid seat with the plug semi-flexibly mounted, either through a flexible actuating arm, or through a flexible connection, between the plug and a rigid actuating arm. An example of such a rotary fluid control valve with a rigid seat and flexible actuating arm is found in U.S. Pat. No. 3,623,696. Most rotary valves with rigid seats have provision for adjusting tne seat in the housing to obtain the desired sealing engagement between the plug and the seat.

U.S. Pat. No. 4,118,008 shows a rotary cam ball valve with a rockable seat having tapered external walls which cooperate with corresponding tapered surfaces in the valve body for permitting angular displacement of the seat in response to forces exerted by the plug.

U.S. Pat. No. 4,215,846 shows an eccentric rotary valve in which the seat has support lips which are designed to flex when loaded by the valve plug. According to the patent, the forces are such that the flexing causes the lips to converge and form a tighter seal with the valve plug.

Although these various types of valves, valve seats and plug arrangements have no doubt found utility in many different applications, they all exhibit one or more shortcomings which have prevented any particular one of the valves from being entirely suitable in a variety of different operating environments.

The desirable characteristics for a rotary fluid control valve include tight shut-off, suitability for use in high pressure flow lines, ability of the design to withstand use with corrosive and erosive fluids, operational ease to minimize actuator loading, durability, especially resistance to wear in the seat and plug seal areas, and low manufacturing and assembly cost. The valves of the prior art meet many of these criteria. Those employing heavy rigid seats have excellent resistance to corrosion and physical damage to the seat, but are generally difficult to adjust for tight shut-off because they do not accommodate irregularities or misalignment between the seat and valve plug. On the other hand, valve designs incorporating thin metal seals or seats accommodate irregularities and misalignment in an effort to provide tight shut-off, but are very susceptible to corrosion and erosion damage. Further, many of the prior art valve designs are not suitable for use in high pressure flow lines.

Rotary cam ball valves inherently experience a great deal of wear on bearings, plugs and seats because of the wiping action and generally high forces experienced during opening and closing. As is well known, high bearing loading can lead to "galling" of the valve shaft and failure of the valve. Prior art rotary valves experience high load forces on their shafts and bearings when the valves are closed which detracts from their ability to operate in high pressure flowpaths. To say it another way, a rotary valve having lower friction during closure, can be used in a higher pressure drop line. Similarly, while such valves are operable in bidirectional flowpaths, the bearing loads and plug and seat friction forces differ substantially depending on whether the high pressure is applied to the front or rear of the plug. Thus it is difficult to optimize the design of a bidirectional rotary cam ball fluid control valve. Consequently, there is a need in the art for a rotary eccentric valve which is capable of satisfying the above criteria.

OBJECTS OF THE INVENTION

A principal object of this invention is to provide an improved rotary fluid control valve.

Another object of this invention is to provide a fluid control valve of the rotary eccentric type which is simple to manufacture and does not require alignment of the seat.

A further object of this invention is to provide an improved rotary plug fluid control valve which is capable of use in high pressure bidirectional flowpaths.

A still further object of this invention is to provide a rotary plug fluid control valve which solves the problems of the prior art.

SUMMARY OF THE INVENTION

In accordance with the present invention, a fluid control valve comprises a body including a valve chamber defining a flowpath, a valve shaft extending into the valve chamber, a valve plug having a spherically convex sealing surface rotatably mounted in the body for limited eccentric movement about an axis in response to movement of the valve shaft, an annular seat ring adapted for sealing engagement with the sealing surface of the valve plug to block the flowpath, means mounting the seat ring in the body for limited movement transversely of the valve plug such that the valve plug tends to center the seat ring during closure of the valve and sealing means sealing the periphery of the seat ring and the body to fluid leakage.

A feature of the invention resides in the provision of a self-centering seat.

Another feature of the invention resides in the provision of seal means for blocking fluid leakage in bidirectional flowpaths.

BRIEF DESCRIPTION OF THE DRAWINGS

Other objects, advantages and features of the invention will become apparent upon reading the following description of the preferred embodiments thereof in conjunction with the drawings in which:

FIG. 5 shows a number of seals A, B, C and D which may be advantageously used with the described valve;

FIG. 6 is a perspective view of a retainer ring useful with the valve of the present invention;

FIG. 7 is a partially broken away perspective view of the seat ring and seals illustrated in FIGS. 1 and 2;

FIG. 8 is a partial section of a portion of a modified seat ring having a resilient seal edge;

FIG. 9 is yet another form of a seat ring with a resilient seal edge; and

FIG. 10 is a partial section of a seat ring showing use of end seals.

DESCRIPTION OF THE PREFERRED EMBODIMENT

Figure 1:
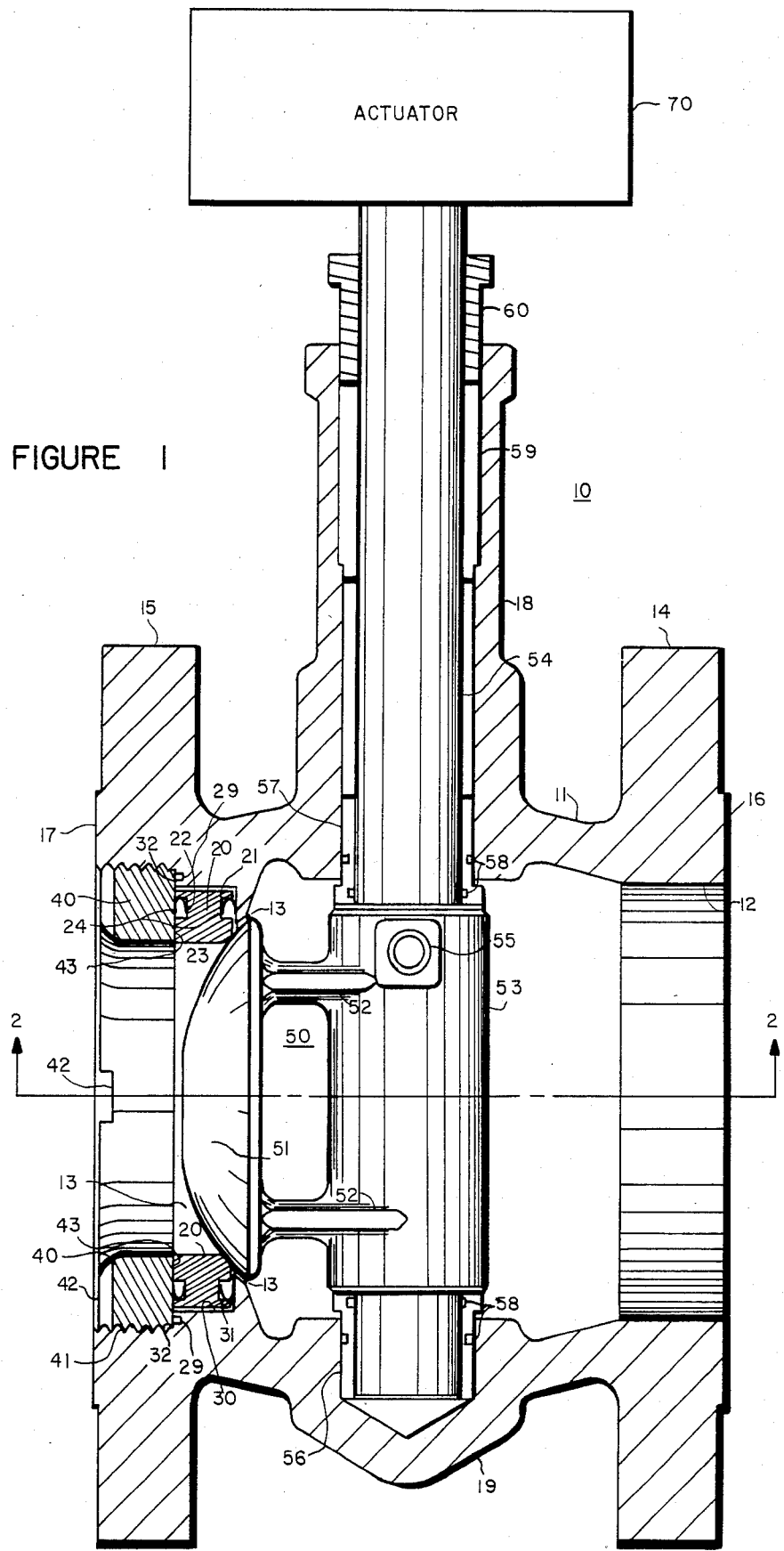
FIG. 1 is a sectional view through a rotary eccentric plug valve constructed in accordance with the present invention.

Referring to FIG. 1 of the drawings, a valve 10 includes a body 11 defining generally circular fluid ports 12 and 13 for entry and exit of fluid therethrough. The area of the body between the ports may be considered a valve chamber in which a flowpath exists when the valve is open. Body 11 may include a pair of flanges 14 and 15, of conventional construction, suitable for connecting the valve into a pipeline (not shown), generally by bolting to mating flanges coupled to the open ends of the pipeline. To facilitate a leakproof connection, machined surfaces 16 and 17 are provided for cooperation with similar surfaces on the pipeline flanges. A suitable gasket may be provided between the flange surfaces to assist in obtaining the leakproof connection. Alternatively the valve may be simply held in place by so-called "through bolting". In that case, the valve body is flangeless and long bolts and nuts connect the flange on each section of pipeline to "sandwich" the valve body therebetween. Valve 10 includes an upright cylindrical neck portion 18 and an axially aligned bottom portion 19 for facilitating mounting of a valve shaft in the body, for example, in bearing inserts positioned out of the flowpath.

A circular seat ring 20 is fitted into a circular recess 30 in the valve body and maintained in position by a threaded retainer ring 40 or other suitable means. The diameter of seat ring 20 is slightly less (about 0.125 in.) than the diameter of recess 30 and its thickness is less than the depth of recess 30, the actual differences in dimension being related to the size of the fluid control valve. The seat ring is thus held in close proximity to a seal surface 31, machined in body 11, which forms the bottom of recess 30. The threaded periphery 41 of the retainer ring cooperates with a similarly threaded portion in flange 15 and is centered on the centerline of port 13. As best shown in FIG. 6, retainer ring 40 has four slots 42 in its external surface, positioned 90° apart, which enable use of a tool for insertion and removal of the retainer ring in the body. A machined seal surface 43, formed on the retainer ring, bears against a shoulder 32, formed in body 11. An annular gasket 29 occupies a suitable recess in the surface of shoulder 32 to help make the junction of shoulder 32 and seal surface 43 fluid tight. Shoulder 32 thus defines the position of seal surface 43 relative to seal surface 31 and enables seat ring 20, which has a thickness less than the distance between the seal surfaces, to axially move a small distance parallel to the centerline of port 13. Since the seat ring diameter is less than that of recess 30, the seat ring is also movable transversely of the centerline of the port.

A cam valve mechanism 50 includes a spherically convex shaped valve plug 51, supported by a pair of webs 52 affixed to a tubular mounting sleeve 53, which, in turn, is affixed to a valve shaft 54 by a pin arrangement 55 or other suitable means. Actuator shaft 54 is mounted for rotational movement in body 11 by means of a lower bearing 56, in bottom portion 19, and an upper bearing 57, inserted in neck portion 18. Optionally, both bearings include an inner and an outer circumferential channel for retention of suitable "O" rings 58 (as shown) for sealing the valve shaft, the bearing inserts and the body against leakage. These latter provisions are of great importance when the valve is used with corrosive fluids.

At the upper part of neck portion 18, a suitable packing material 59 and a packing nut arrangement 60 are provided. The packing nut arrangement 60 may be conventional and adapted to compress packing material 59. The particular arrangement selected will be seen to be a matter of choice and is not involved with, or part of, the present invention. An actuator 70 is indicated at the top of valve shaft 54 and may comprise any of a number of well known actuator mechanisms for imparting a limited rotary motion to valve shaft 54 for opening and closing the valve. Actuator 70 may be remotely controlled or it may comprise a simple manual control member.

Figure 2:
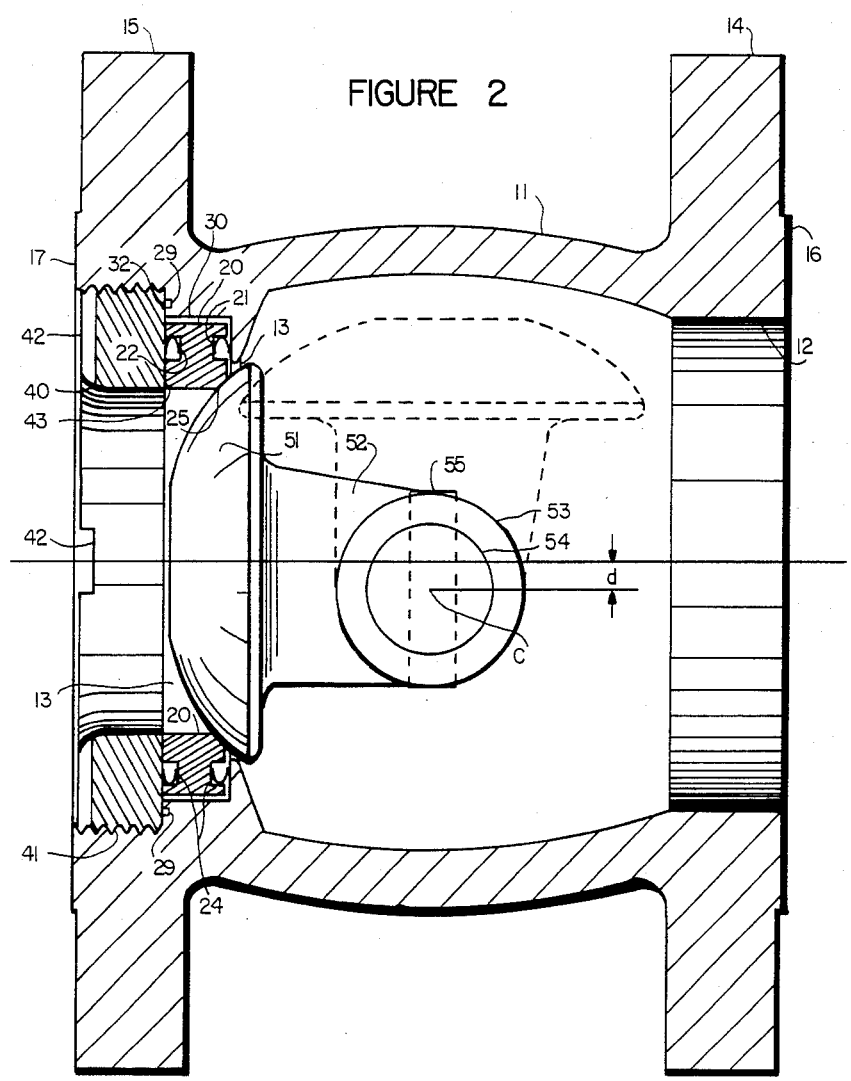
FIG. 2 is a view of the valve of FIG. 1 taken along the line 2—2.

Reference to FIG. 2 clearly shows the offset or eccentric arrangement of the cam valve. In particular it will be noted that the center C of valve shaft 54 is offset by a distance "d" from the centerline of spherical valve plug 51 and ports 12 and 13. As clearly shown in the dotted line phantom view, indicating the open position of valve plug 51, counterclockwise rotation of valve shaft 54 drives valve plug 51 into contact with the seal edge 25 of seat ring 20. Because the actuator shaft is offset from the centerline of valve plug 51, the initial contact may, for example, occur at the lower portions of valve plug 51 and seal edge 25, and valve plug 51 will urge seat ring 20 which is both laterally and axially movable with repect to the centerline of the valve plug, into its correctly centered position automatically during closure of the valve. Thus self centering of seat ring 20 is obtained with the present invention. Throughout valve operation there is no flexure of the valve plug webs or the actuating mechanism, nor does the seat itself undergo flexure as occurs in many prior art designs.

It will be appreciated by those skilled in the art that the valve of the present invention is capable of operation in higher pressure environments than prior art cam ball valves of similar size and construction because of the minimum loading on the valve seat ring, plug, bearings and shaft. Also, with the invention, lower manufacturing costs are obtainable in rotary cam valves of comparable size and ratings. The valve of the present invention is also suitable for high temperature operation, involving temperatures on the order of 800° Farenheit, with proper selection of materials. The body may be cast of a high carbon steel such as WCB for general applications or of a type 316 stainless steel for use with corrosive and erosive fluids, if similar high quality materials are used for the seat ring and valve plug. The spherically convex surface of valve plug 51 is accurately machined. The flat portion on the end of the plug results from the methods used to facilitate machining and is not part of the present invention.

The seat ring 20 in FIGS. 1 and 2 is seen to contain a pair of annular channels 21 and 22 in its opposite faces. Nested within each channel is an annular seal ring 24, having a generally "C" shaped cross section. The sides of the seal rings are self-biased outwardly and exert opposing forces between the bottom of the channels in the seat ring and seal surfaces 31 and 43 on body 11 and retainer ring 40, respectively. The range of movement of the seat ring in the direction of flow in the preferred embodiment of a rotary valve designed for use in 6" diameter pipelines is a minimum of 0.006 in. and a maximum of 0.025 in. The seal rings must, of course, be capable of bridging the gaps between seat ring 20 and the seal surfaces. While seat ring 20 is free to move when the valve is open, valve plug 51 forces it against retainer ring 40 when the valve is closed and the resulting gap between the seat ring and seal surface 31 must be bridged by the seal ring 24 adjacent to seal surface 31.

The valve of the invention is ideally suited for use in bidirectional flowpaths, that is, where the flow direction may be either from the right or the left. As mentioned previously, prior art rotary cam ball valves cannot be optimally designed for such bidirectional use since the seat-plug loading is so high. Pressure on the cam ball side of the plug determines the maximum bearing and valve shaft loads and minimum seat-plug loading. On the other hand, pressure on the back side of the plug determines the maximum seat-plug loads that are encountered. Thus, an optimal design for use in bidirectional flowpaths needs to compromise the tendency to leak with the excessive wear and tear on the seat-plug bearings and shaft.

To the contrary, the present invention teaches a rotary cam ball design where seat-plug loading is much lower and determined primarily by the pressure in the line. Much lower wear and tear is experienced as a result and bearing and valve shaft life are enhanced.

Should use in a unidirectional flowpath only be contemplated, the leftmost seal ring 24 and channel 22 may be dispensed with. With a "C" type seal ring, pressure exerted at the open side tends to further outwardly distend the sides of the seal ring and thereby increase the sealing pressure exerted. Further, use of "C" type seal rings permit looser tolerances than the use of O-ring seals. Thus, seal ring performance is improved with increased pressure, provided the pressure is applied to the open side of the seal ring and provided, of course, that system design limits are not exceeded. With both seal rings illustrated in FIGS. 1 and 2, the valve is suitable for equally effective use in flowpaths in which pressure exists on the left side of valve plug 51 as well as in flowpaths in which pressure exists on the right side of plug 51.

Assuming pressure exists on the left side of valve plug 51, fluid leakage through the junction of retainer ring 40 and seat ring 20 (seal surface 43) will be blocked by the leftmost one of seal rings 24, which opens outwardly toward the pressure side, thus tending to increase its sealing action with increased pressure. On the other hand, for pressure flow on the right side of valve plug 51, the rightmost seal ring will act in a similar manner to block fluid leakage along seal suface 31.

As mentioned previously, the outer diameter of seat ring 20 is 0.125 in. smaller than the diameter of recess 30 which limits the amount of transverse movement of seat ring 20. However, manufacturing tolerances of the valve parts are such that sufficient movement is permitted to enable the seat ring to be self-centering responsive to closure of the valve.

Figure 3:
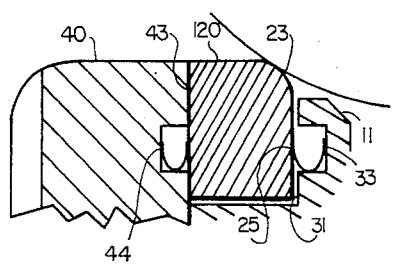
FIG. 3 shows a portion of the valve of FIG. 1 with a different seal arrangement.

FIG. 3 illustrates a different arrangement of seal rings in which the seal rings are housed in annular channels cut in the body and the retainer ring, respectively, rather than in the seat ring. Here a seat ring 120 has a substantially rectangular cross section with a rounded seal edge 23 formed on forward surface 25. An annular channel 33 is formed in seal surface 31 of body 11, and a similar annular channel 44 is formed in seal surface 43 of retainer ring 40. The seal rings are positioned within channels 33 and 44 with their open sides arranged as shown, which enables reaction to pressure on either side of seat ring 120 to increase the sealing engagement with one of the seal rings and its corresponding seal surface.

Figure 4:
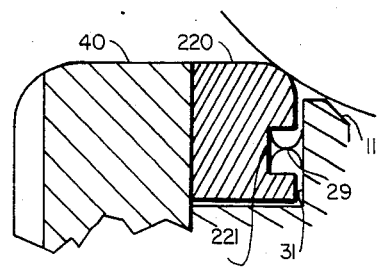
FIG. 4 shows another form of seal arrangement.

In FIG. 4 a still different embodiment is illustrated with a single seal ring of generally "X" cross-section. Here a seat ring 220 has a single channel 221 formed in one of its faces and a seal 29 having an an "X" shaped cross-section is positioned with its base bottomed in the channel and its top in contact with seal surface 31. It will be apparent that pressure on either side of the seal ring 29 tends to increase the sealing pressure against the bottom of channel 221 and the adjacent seal surface 31.

FIG. 5 illustrates four different types of seal rings, A, B, C and D which may advantageously be employed with the invention. Seal ring 24 is indicated by A and having a "C" shaped cross section, has already been described. Seal ring 24 is preferably fabricated of metal and exerts a substantial force upon compression. Seal ring 26, indicated by B, has a generally "E" shaped cross section. It has a lower spring rate than seal ring 24 with a "C" shaped section. It is thus similar to seal ring 24 although slightly superior in performance and should be employed with the open end of the E facing the pressure side. Seal ring 27, indicated by C, is similar to seal ring 24 but includes a coiled spring for increased resistance to compression. It therefore tends to keep its shape. It may comprise a metal body coated with plastic, or an all plastic body. Seal ring 29, indicated by "D", has the "X" shaped cross section just discussed in connection with FIG. 4 and essentially functions like two back-to-back "C" seals. All of the seal rings are suitable for use in the valve of the invention. Their illustration merely indicates a range of useful equivalent parts. Conventional "O" ring seals may also be used in suitable environments where high pressures are not encountered. However, tighter tolerances between the seat and the machined surfaces and the channel depth will need to be maintained.

FIG. 6 is a perspective view of retainer ring 40 illustrating its general construction. Threaded surface 41 cooperates with corresponding threads in the body and slots 42 facilitate use of a tool for installation and removal of the retainer ring. It will be apparent that all of the valve parts are removable for service and replacement, if required. The slotted face of the retainer ring needs no special finishing.

FIG. 7 illustrates a partially broken away view of seat ring 20 showing annular channels 21 and 22 with seal rings 24 positioned therein. The broken away section clearly shows the arrangement of seal rings 24 within the channels.

FIG. 8 depicts a "soft seat" version of a seat ring useful with the invention. Specifically, seat ring 320 includes channels 21 and 22 having seal rings 24, as previously described, positioned therein. A "U" shaped slot 321 is formed in the rounded surface of the seat ring that normally contacts the valve plug in a sealing engagement and a ring of suitable plastic material 322 is supported in the slot. The plastic material provides a soft seal surface for the valve plug. Thus a resilient seal is incorporated with the self-centering seat ring and provides a useful arrangement for certain operating environments, such as those requiring extremely tight shutoff.

FIG. 9 illustrates still another arrangement of a soft seat in the self-centering seat ring. Here a two piece seat ring, comprising a front portion 420 and a rear portion 421, is arranged to hold a previously formed plastic ring 422 between them. Each of portions 420 and 421 includes a respective channel 22 and 21 retaining an appropriately positioned seal ring 24. The two pieces may be held together by any convenient means.

In FIG. 10 a further modification of a seat ring is illustrated wherein two seal rings are provided on the outer periphery of the seat ring rather than in its faces. Specifically, a seat ring 520 has a pair of channels 521 formed in its periphery, within which oppositely facing seal rings 24 of "C" cross section are disposed. The seal rings, being positioned in a back-to-back arrangement with their open sides facing outwardly, operate substantially as previously described to block fluid leakage from either direction. In this embodiment the seal rings must be capable of rather large flexures in order to effectively seal in the presence of the relatively large transverse self-centering movement of the seat ring 420 during closure of valve 51.

What has been described is a novel eccentric cam valve having a self-centering seat ring. It will be recognized that numerous modifications and changes in the described embodiments of the invention may be made by those skilled in the art without departing from the true spirit and scope thereof. The invention is to be limited only as defined in the claims.

What is claimed is:

1. A fluid valve comprising:
   a body including a valve chamber defining a flowpath;
   a valve shaft extending into said body;
   a valve plug, having a spherically convex sealing surface, rotatably mounted in said body for limited eccentric movement about an axis in response to the movement of said valve shaft;
   an annular seat ring adapted for sealing engagement with the sealing surface of said valve plug to block said flowpath;
   means mounting said seat ring in said body for limited movement of the center of said annular seat ring axially to and transversely of said valve plug such that said valve plug tends to center said seat ring during closure of said valve; and
   sealing means sealing the periphery of said seat ring and said body against fluid leakage.

2. A valve as set forth in claim 1 wherein said sealing means includes pressure seal means between said seat ring and said body.

3. A valve as set forth in claim 2 wherein said pressure seal means has a sealing action that improves with pressure.

4. A valve as set forth in claim 2 wherein one of said annular seat ring and said body includes an annular groove for retention of said pressure seal means.

5. The valve as set forth in claim 4 wherein said mounting means comprise a portion of said body defining a first seal surface cooperating with said pressure seal means, and further including;
   retainer ring means, affixed to said body in said chamber defining a second seal surface cooperating with said seat ring.

6. A valve as set forth in claim 5 wherein said valve is adapted for bidirectional flow in said flowpath and wherein said pressure seal means are adapted to improve sealing action with pressure from either direction.

7. A fluid valve comprising:
   a body including a valve chamber defining a generally circular fluid port establishing a first axis in said chamber;
   bearing means in said body defining a second axis in said chamber perpendicular to and offset from said first axis;
   a valve shaft rotatably mounted in said bearing means and extending outside said body;
   a valve plug having a spherically convex sealing surface mounted to said valve shaft for limited eccentric movement about said second axis toward and away from said port responsive to movement of said valve shaft;
   an annular seat ring adapted for sealing cooperation with the spherically convex sealing surface of said valve plug to block fluid flow through said port;
   means supporting said annular seat ring for limited movement both axially along and transversely of said first axis of said port such that said valve plug tends to center said annular seat ring during closure of said valve; and
   pressure sealing means between said annular seat ring and said body for blocking fluid leakage.

8. A valve as set forth in claim 7 wherein said pressure sealing means improves its sealing action with pressure.

9. A valve as set forth in claim 7 wherein one of said annular seat ring and said body includes an annular groove for retention of said pressure seal means.

10. The valve as set forth in claim 9 wherein said mounting means comprise a portion of said body defining a first seal surface cooperating with said pressure seal means, and further including:
    retainer ring means, affixed to said body in said chamber, defining a second seal surface cooperating with said seat ring.

11. A valve as set forth in claim 10 wherein said pressure seal means includes two oppositely directed generally "C" shaped seals, and wherein channel means are provided adjacent one of said seal surfaces for retention of said seals.

12. The valve as set forth in claim 9 wherein said pressure seal means are positioned to act on the outer peripheral surface of said annular seat ring and includes two oppositely direrted generally "C" shaped seals.

13. A valve as set forth in claim 11 wherein said pressure seal means comprises first and second generally "C" shaped pressure seals, and wherein said annular seat ring includes a first annular groove retaining a first one of said pressure seals for cooperation with said first seal surface and a second annular groove retaining a second one of said pressure seals for cooperation with said second seal surface.

14. A valve as set forth in claim 13 wherein said body includes a shoulder providing a stop for said retainer ring means and defining a distance between said first and said second seal surfaces, said annular seat ring having a thickness slightly less than said distance, and wherein said "C" shaped seals provide sealing action over a distance greater than said difference.

15. A valve as set forth in claim 10 wherein said pressure seal means comprise a pair of generally "C" shaped annular seal rings, and wherein a first annular groove is formed in said portion of said body and a second annular groove is formed in said retainer ring means respectively, said seal rings being positioned in said annular grooves with their open sides oppositely directed to oppose fluid leakage from either direction in said valve.

16. A valve as set forth in claim 15 wherein said body includes a shoulder providing a stop for said retainer ring means and defining a distance between said first and said second seal surfaces, said annular seat ring having a thickness slightly less than said distance, and wherein said "C" shaped seals provide sealing action over a distance greater than said difference.

17. The valve as set forth in claim 7 wherein said annular seat ring includes a resilient portion for said sealing cooperation with said valve plug.

18. A fluid valve adapted for bidirectional high pressure fluid flow comprising:
   a body including a valve chamber defining a generally circular fluid port establishing a first axis in said chamber along the centerline of said port;
   a pair of bearings in said body defining a second axis transverse to and offset from said first axis;
   a valve shaft mounted for rotation in said bearings responsive to externally applied forces;
   a valve plug having a spherically convex sealing surface mounted to said valve shaft, said valve plug being offset for limited eccentric movement about said second axis for opening and closing said fluid port;
   an annular seat ring adapted for sealing cooperation with the spherically convex sealing surface of said plug to block fluid flow in either direction through said port;
   means mounting said seat ring in said body for limited movements parallel to and transverse of the centerline of said valve plug when in its closed position such that said valve plug tends to center said seat ring during closure of said valve; and
   sealing means sealing the periphery of said seat ring from fluid leakage in either direction in said valve chamber.

19. A valve as set forth in claim 18 wherein said sealing means comprise a seal having a characteristic which tends to increase the sealing force on the sealed surfaces with increases in fluid pressure.

* * * * *

UNITED STATES PATENT AND TRADEMARK OFFICE
CERTIFICATE OF CORRECTION

PATENT NO. : 4,519,579

DATED : May 28, 1985

INVENTOR(S) : Ronald R. Brestel; Dale L. Meyer

It is certified that error appears in the above-identified patent and that said Letters Patent is hereby corrected as shown below:

```
Column 1, line 23, "tne" should be --the--;
Column 5, line 42, "wnich" should be --which--;
Claim 10, line 2, "mountling" should be --mounting--; and
Claim 12, line 4, "direrted" should be --directed--.
```

Signed and Sealed this

First Day of October 1985

[SEAL]

Attest:

Attesting Officer

DONALD J. QUIGG

Commissioner of Patents and Trademarks—Designate